Jan. 31, 1967  B. P. KUNZ  3,301,732
SANDWICH PANEL JOINT AND METHOD
Filed Feb. 25, 1963  2 Sheets-Sheet 2

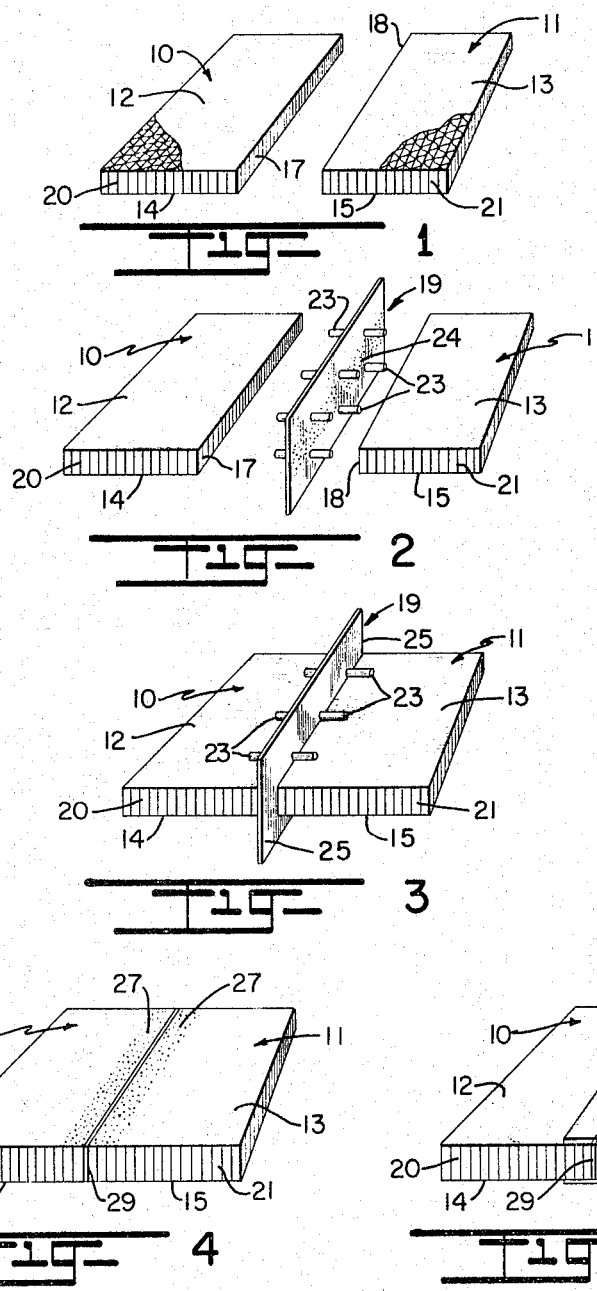

INVENTOR.
BERNARD P. KUNZ
BY
ATTORNEY

United States Patent Office 3,301,732
Patented Jan. 31, 1967

3,301,732
SANDWICH PANEL JOINT AND METHOD
Bernard P. Kunz, 5623 S. Huron,
Littleton, Colo. 80120
Filed Feb. 25, 1963, Ser. No. 260,681
4 Claims. (Cl. 156—304)

This invention relates to a method for joining flat or curved panels fabricated of laminations of high density facing materials bonded to a low density intermediate core and generally known as sandwich panel structures.

Sandwich panel structures usually are made of two relatively thin, dense, strong sheets of facing material between which is sandwiched a relatively thick, low density honeycomb, cellular, foamed, etc. core material. The sheets of facing material generally are made of reinforced resins or plastic materials for added strength. These panel structures are designed to be strong, lightweight structural members for use in aircraft construction, radome construction, radar-dish construction, sound-proofing and building construction in general.

In the use of sandwich panel sections for such applications, a problem is encountered in making joints between the edges of joined panels, which are neat, strong and conveniently made without the use of expensive or cumbersome machinery.

Accordingly, it is an important object of this invention to provide a sandwich panel joint which is neat and sufficiently strong to withstand the application of tensile and compressive stresses to the facing sheets of the joined panel sections of the magnitude encountered in the particular construction application of the panel, without distortion or dimesional change of the panel structure.

Another object of this invention is to provide a rapid, convenient and inexpensive method, not requiring expensive, elaborate or cumbersome machinery, or auxiliary equipment for making such a sandwich panel joint.

Additional objects of this invention will become apparent from the following description, which is given primarily for purposes of illustration and not limitation.

Stated in general terms, the objects of this invention are attained by providing a method for making a sandwich panel joint which includes the steps of aligning the two sandwich panels to be joined, positioning a relatively flat shear member, or jointer member transversely between the flat, aligned edges of the sandwich panels, bonding the respective edges to opposite sides of the flat jointer member, preferably with the aid of adhesive material, and removing any surrounding jointer member material from the resulting panel joint. The bonding step preferably is performed with the aid of pressure applied and maintained linearly along each panel toward the jointer member while the joint is setting. The alignment of the panels preferably is maintained during the bonding step with the aid of locating pin means mounted in the jointer member, and positioned above and below the panels to positively hold them in position and alignment. The resulting joint preferably is finished by applying a strip, or sheet, of material similar to that of the panel facings, over each side of the resulting joint and in the planes of the facing sheets.

A more detailed description of specific embodiments of the invention is given below with reference to the appended drawings, wherein:

FIGURE 1 is a schematic isometric view showing two sandwich panels to be joined;

FIGURE 2 is a similar veiw showing in addition a transversely positioned jointer member provided with alignment pins;

FIGURE 3 is a similar view showing a joint after setting;

FIGURE 4 is a similar view showing the joint after the surrounding jointer member material has been removed;

FIGURE 5 is a similar view showing a finished joint after the application of facing strips thereto;

Figure 6:
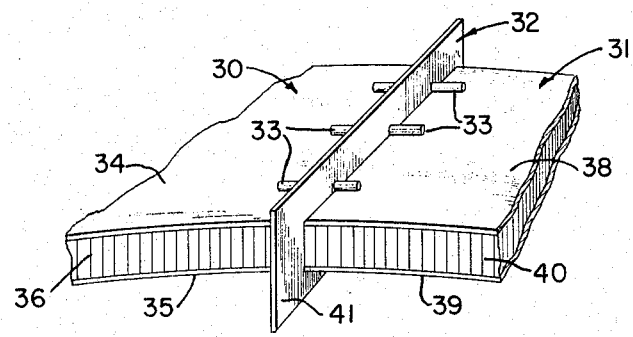
Figure 7:
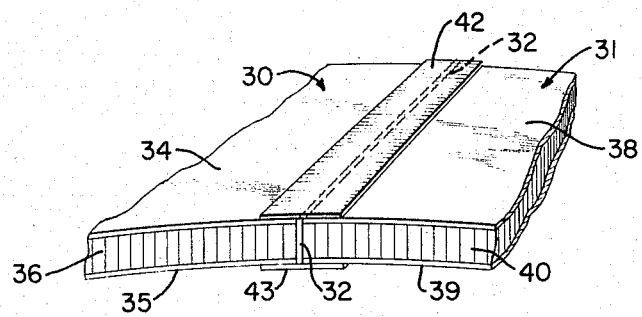
Figure 8:
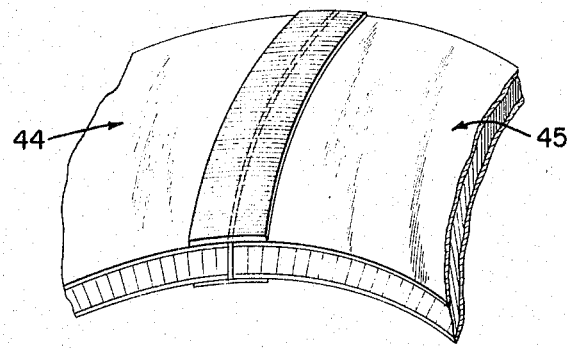

FIGURES 6 and 7 are views similar to those of FIGURES 3 and 5 but showing the joining of curved sandwich panels; and FIGURE 8 is a view similar to those of FIGURES 5 and 7 but showing the joining of spherical sandwich panels.

The sandwich panel sections 10 and 11, to be joined, are placed in position with the aid of conventional jigs and fixtures, not shown, so that corresponding pairs of facing sheets 12 and 13, and 14 and 15, respectively, are coplanar, as shown. The adjacent edges 17 and 18 of panel sections 10 and 11, respectively, to be joined are shaped or cut neatly and cleanly with a suitable saw, for example, so that supplementary plane surfaces or edges are formed at each edge 17 and 18. The planar surfaces or edges 17 and 18 should be such that they will engage shear member or jointer member 19 evenly without leaving spaces or gaps due to irregular shaping or cutting of the edges. Although jointer member 19 is shown at right angles to panel sections 10 and 11, it will be understood that the included angle can be any other suitable angle in addition to the 90°, or right angle.

Shear member or jointer member 19 is a sheet of material having properties similar to those of facing sheets 12 to 15, and preferably is made of the same resin or plastic of which the facing sheets are made. Member 19 preferably should be sufficiently hard to withstand a compressive force substantially equal to that withstood by facing sheets 12 to 15. In addition, member 19 should be more rigid and strong than the low density core material 20 and 21, bonded between the pairs of spaced facing sheets 12 and 14, and 13 and 15, respectively.

To insure and maintain coplanar alignment of facing sheets 12 and 13, and 14 and 15 of panel sections 10 and 11, while bonding the joint of the panel sections with jointer member 19, locating pins 23 are mounted in the jointer member by being pegged in apertures properly positioned through the jointer member. Locating pins 23 are properly aligned in two rows, as best shown in FIGURE 2, which are spaced so that the ends of panel sections 10 and 11 are snugly fitted between the rows of the pins, as best shown in FIGURE 3, while the joint between the panel sections is being made.

However, before the joint is assembled as shown in FIGURE 3, jointer member 19 is provided on each side thereof, in area 24 (only one area 24 shown), corresponding to the areas of the plane surfaces or edges 17 and 18, respectively, with a suitable bonding agent, such as an adhesive layer, layer of cement, film of vaporizable bonding solvent, etc., as best shown in FIGURE 2. Panel sections 10 and 11 then are brought together with jointer member 19, as shown in FIGURE 3, and pressure is applied to the panel sections by any suitable means (not shown). The pressure is applied to panel sections 10 and 11 to urge the sections toward each other and in tight, pressure engagement with the areas 24 of the bonding agent applied to jointer member 19.

This bonding pressure is maintained on panel sections 10 and 11 and jointer member 19 until the bonding agent has properly set to make the desired strong permanent joint, as shown in FIGURE 3. After the bonding agent has set, the locating pins 23 and the surrounding area 25 of jointer member 19 are removed. The surrounding area 25 is cut from jointer member 19 by the use of suitable means, such as a saw. Any irregular, projecting portions of jointer member 19 are ground off and buffed so that a smooth joint results, as shown in FIGURE 4.

The resulting joint is finished by applying suitable areas 27 (only one area 27 shown) on each side of the joint, as shown in FIGURE 4, of the bonding agent, and placing a strip or sheet 28 of corresponding area over each of the bonding agent areas 27. The strips 28 preferably are made of reinforced or reinforcing material having the reinforcing elements running transversely of the joint 29 for maximum strengthening of the joint. In a preferred specific embodiment of the invention, strips 28 are glass fiber strips or glass fiber-containing strips having strength characteristics substantially equal to, or greater than, those of facing sheets 12 and 13. When strips 28 are continuous sheets of material and it is desired to maintain a smooth, uniform surface across the joint 29, the areas of panel sections 10 and 11 coinciding with bonding agent area 27 are indented or ground down to a depth approximating the combined thickness of the bonding agent applied at area 27 and the strips 28.

The resulting joint, constructed as described immediately above, satisfactorily bears substantially all of the loads that panel sections 10 and 11 are required to bear. In other words, the resulting bonded, jointed, enlarged structure has generally the physical and mechanical properties exhibited by the original sandwich panel sections 10 and 11 before being joined. The jointer, or shear, member 19 precludes shear or collapse failures of the joint 29, at the joined edges 17 and 18 of panel sections 10 and 11, respectively, by making such edges stronger and more rigid than the intermediate core material 20 and 21, between facing sheets 12 and 14, and 13 and 15, respectively. The alignment of the facing sheets through jointer member 19, which has a compressive strength value substantially equal to that of the facing sheets, results in joint 29 withstanding heavy compression loads and transmitting such loads into the facing sheets 12, 13, 14 and 15 of panel sections 10 and 11.

Also, the high tensile strength properties of the strips 28 results in successfully withstanding and transmitting tensile loads which are applied thereto, to facing sheets 12, 13, 14 and 15. Actual evaluation and testing of the sandwich panel joint of the invention has shown that the load carrying ability of the joint is substantially as great as that of the panel sections 10 and 11. In actual practice, the highly reliable joint of the invention can be constructed rapidly, conveniently and inexpensively without the use of elaborate tools or fixtures, in the manner described hereinabove.

Although the method and joint of the invention has been described above, with reference to FIGURES 1 to 5, as applied to joining planar or flat panel sections 10 and 11, it is to be understood that the invention is not limited to such flat panel application. It will be understood that the invention also is applicable to the joining of curved sandwich panel sections having various shapes or curvatures, such as parabolic, hyperbolic, spherical, etc. This will be seen upon referring to FIGURES 6 to 8.

Curved sandwich panel sections 30 and 31 shown in FIGURE 6 are joined to a jointer member, or shear member, 32 with the aid of a set of locating pins 33 in a manner similar to that described hereinabove with reference to FIGURES 1 to 5. Sandwich panel section 30, FIGURE 6, consists of spaced parallel, curved facing shells 34 and 35 with low density core material 36 bonded therebetween. Similarly, sandwich panel section 31 is made up of shells 38 and 39 between which is bonded low density core material 40. Of course, the abutting edges of sections 30 and 31 are treated and shaped as described in connection with edges 17 and 18. After the joint is made with the aid of a bonding agent, the locating pins 33, the surrounding areas 41 of jointer member 32 are removed. This is accomplished, as previously described, after the joint has set and become permanent. The resulting joint is finished by the application thereto of strips 42 and 43, also as previously described, and as indicated in FIGURE 7.

FIGURE 8 shows a similar joint made of spherical sandwich sections 44 and 45. Joints of the types shown in FIGURES 7 and 8 are important in the construction of huge radomes and radar dishes and other constructions, such as large domed building structures, marine structures, artic shelters, etc. Such radomes and radar dishes are used for satellite tracking purposes, radio astronomy, radar screens, and the like. They are constructed of strong, lightweight materials including sandwich panels. The facing sheets of sandwich panels used in radar dish and radome construction, and the jointer or shear member, are made of strong, reinforced resins, such as epoxy-based resins reinforced with glass cloth or glass fibers. The facing strips also can be made of a glass fiber-reinforced epoxy-based resin. The core material can be honeycomb made of an epoxy-based resin or polyurethane foam.

Where heat is an important factor, such as in aircraft construction, for example, the facing sheets of the sandwich panels employed can be made of a reinforced phenolic-based resin. The reinforcing material may be glass cloth, glass fibers, metal cloth, metal fibers, etc. The jointer member and the finishing facing strips can be made of similarly reinforced phenolic-based resins, glass fibers or cloth, metal fibers or cloth, etc. The core material can be lightweight metal honeycomb, such as aluminum honeycomb, phenolic resin-based honeycomb, heat resistant polyurethane foam, and the like.

For ordinary construction work, such as aircraft cabin flooring, wall structures, sound insulation, etc., the cheaper grades of reinforced phenolic, urea, polyamide, polyol, melamine, epoxy, polyester, etc., based resins may be used for the sandwich panel facing sheets, jointer member and joint-finishing strips, and the core material can be paper honeycomb, polyurethane foam, glass fiber matt, etc.

Obviously, many other modifications and variations of the sandwich panel joint and method of the present invention are possible in the light of the teachings given hereinabove. It is therefore, to be understood that, within the scope of the appended claims, the invention can be practiced otherwise than as specifically described.

What is claimed is:

1. A method of making an edge-wise joint between two panel-like sections having edges and faces, comprising: the steps of aligning said sections in edge-to-edge relationship with a corresponding face of each section in coplanar relationship, positioning a jointer member having a width greater than the thickness of said sections between said edges, applying adhesive means on adjacent surfaces of said edges and jointer member, maintaining said sections in coplanar alignment while said adhesive means bonds said adjacent surfaces together by attaching aligning means to said jointer member extending along either side of said faces, and separating excess jointer member material and said aligning means from the area of said joint.

2. The method of claim 1 in which said aligning means are pins.

3. The method of claim 1 including adhesively bonding a finishing strip to the coplanar faces of said sections on both sides of said joint overlapping its edges and lying parallel to said jointer member.

4. An assembly for making a structure of two panel sections joined in edge-wise relationship comprising: two panel sections having edges and faces, said panel sections aligned in edge-wise relationship with their corresponding faces in coplanar relationship, a jointer member positioned between said edges and extending beyond said faces on each side of said panel sections, adhesive means between adjacent surfaces of said jointer member and said edges operative to harden and secure said surfaces together, and upper and lower horizontal rows of pins extending laterally from each side of said jointer member for maintaining the adjacent edges of said panels in aligned position between respective horizontal rows of pins while said adhesive hardens or sets.

References Cited by the Examiner

UNITED STATES PATENTS

| | | | |
|---|---|---|---|
| 1,207,853 | 12/1916 | Burrell | 156—304 X |
| 1,703,667 | 2/1929 | Green | 52—417 |
| 2,313,990 | 3/1943 | Crandell | 72—16 |
| 2,785,286 | 3/1957 | Lichtgarn | 161—68 XR |
| 3,036,947 | 5/1962 | Marra | 156—313 |

FOREIGN PATENTS 619,991  5/1961  Canada.

EARL M. BERGERT, *Primary Examiner.*

J. J. BURNS, T. R. SAVOIE, *Assistant Examiners.*